Oct. 20, 1953 R. B. BELL 2,655,859
AUTOMATIC COFFEE MAKER
Filed May 14, 1947 3 Sheets-Sheet 2
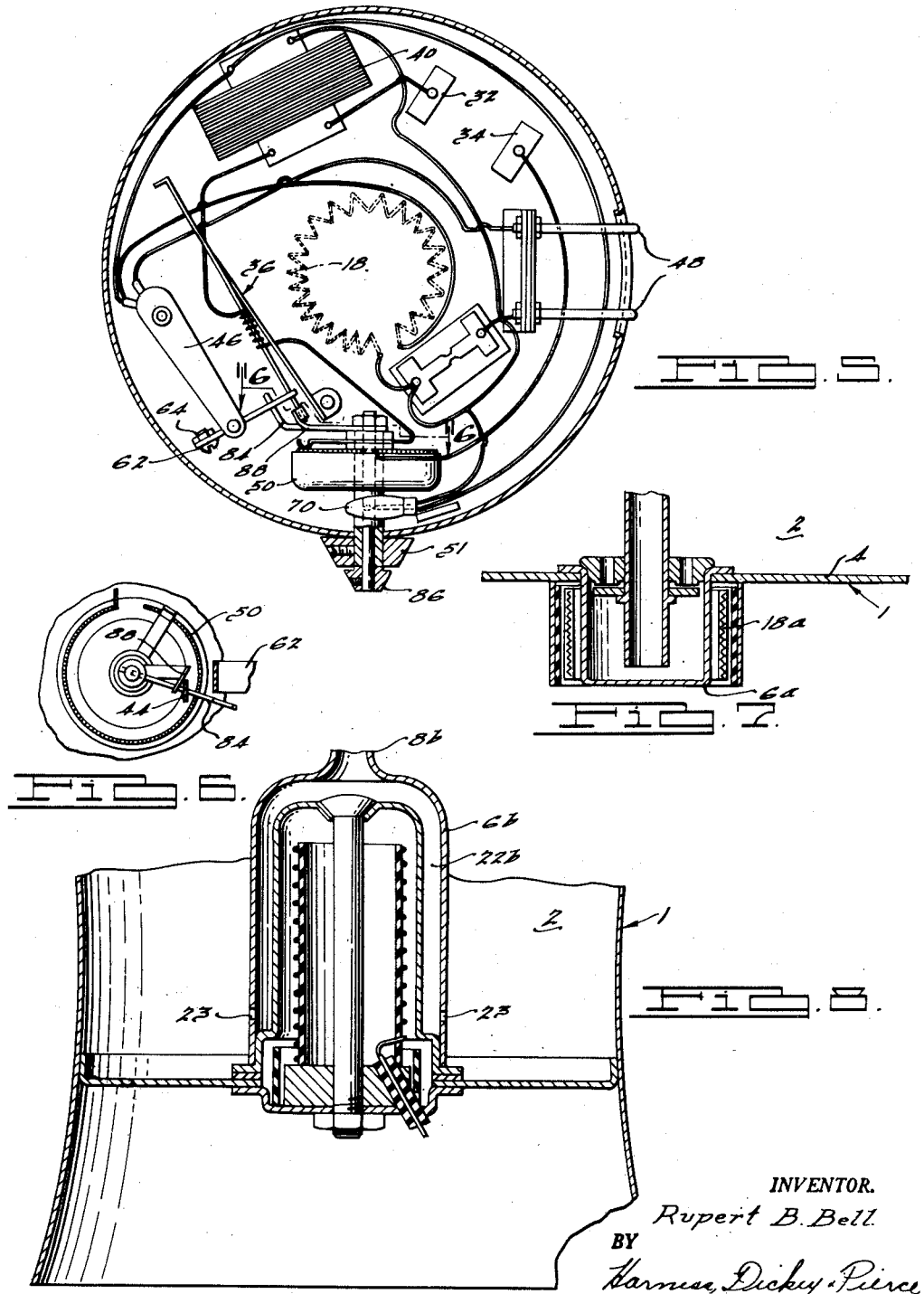
INVENTOR.
Rupert B. Bell
BY
Harness, Dickey & Pierce
ATTORNEYS Oct. 20, 1953  R. B. BELL  2,655,859
AUTOMATIC COFFEE MAKER
Filed May 14, 1947  3 Sheets-Sheet 3
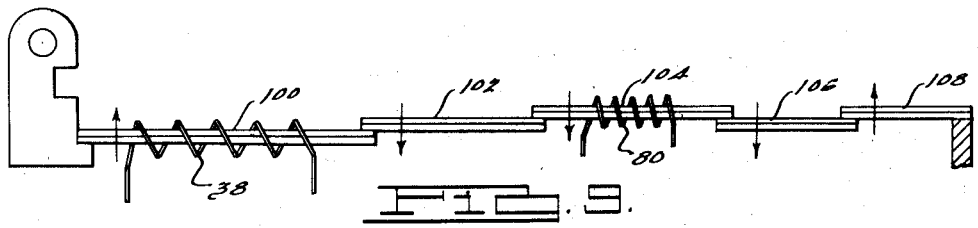
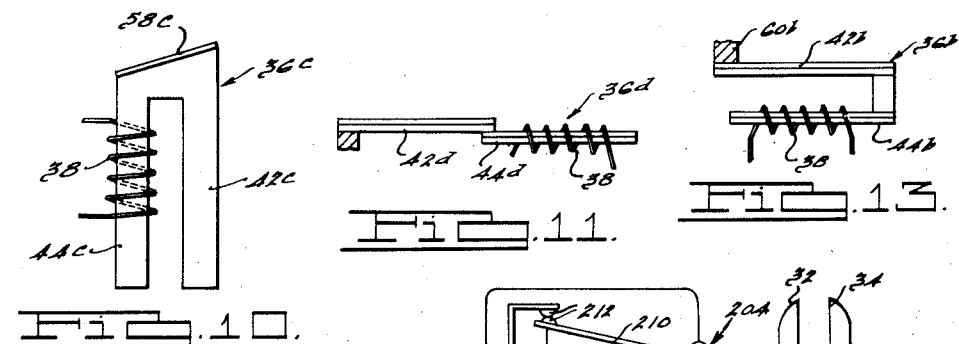
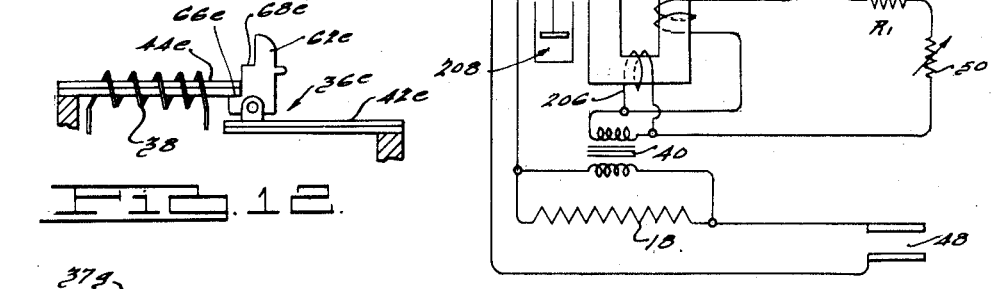
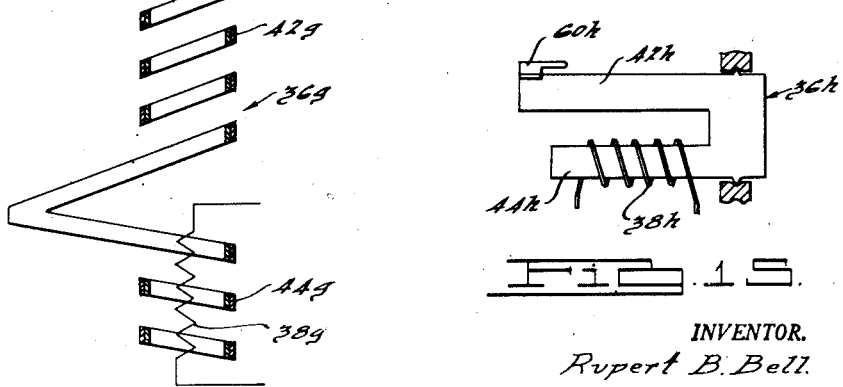
INVENTOR.
Rupert B. Bell
BY
Barnes, Dickey & Pierce
ATTORNEYS

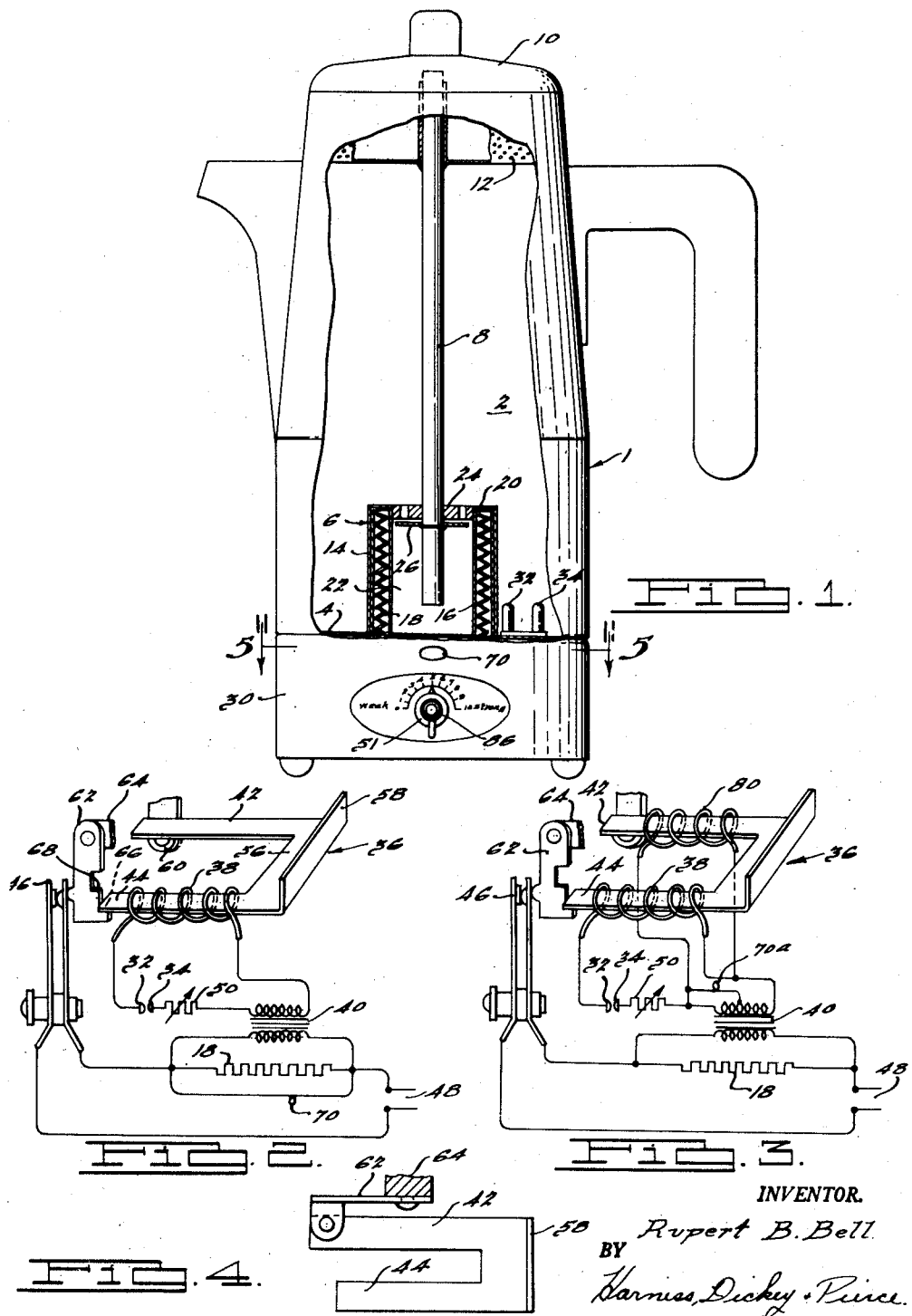

Patented Oct. 20, 1953

2,655,859

UNITED STATES PATENT OFFICE 2,655,859

AUTOMATIC COFFEE MAKER

Rupert B. Bell, Ann Arbor, Mich.

Application May 14, 1947, Serial No. 747,939

7 Claims. (Cl. 99—281)

This invention relates generally to electrical controlling systems and more especially to such a system which is compensated for one or more variables which might render the system inaccurate and which may be used, among other uses, in a coffee-brewing apparatus.

Various types of automatic coffee makers are known to the art and may be classed in two general classifications: (1) those in which the brew is controlled by a thermostat responsive to temperature of the brew, and (2) those operating in accordance with the conductivity of the brew.

The thermostatically controlled mechanism generally employs a thermostat which is responsive to the temperature of the brew in the pot and which acts upon the attainment by the brew of a predetermined temperature to discontinue the percolating or other brewing of the mixture and depends upon the principle that the length of time required to heat the brew to the desired temperature is the same time which is required to bring the brew up to strength. In the normal percolator, percolation starts almost immediately after the heat is applied, and the main body of the liquid in the coffee maker heats up very slowly, so that if percolation is started with water of a given temperature when the water in the pot has heated up to a desired temperature, the brew will be of the proper strength.

This type of control has three inherent errors: (1) It is sensitive to voltage variations, since, if the voltage increases, the rate of percolation is increased and the strength of the coffee or brew in the pot is too great when the main body of the liquid in the pot reaches the predetermined temperature at which the thermostat discontinues percolation. (2) It is sensitive to initial water temperature so that, if the temperature of the water which is initially placed in the pot is lower than normal, the coffee will again become too strong before the body of the liquid reaches the predetermined temperature for actuating the thermostat; and, conversely, if hot water were placed in the pot, the main body would be heated to the temperatures at which the thermostat stops percolation prior to the brew obtaining the desired strength. (3) It is very sensitive to relative proportions of liquid and coffee or other concentrate, so that the user, to obtain anywhere near satisfactory operation, must use water at an initial substantially constant temperature, but even then inaccuracies will still result from voltage variations which are inherent in substantially all if not all public utility distribution lines.

The second general type of automatic coffee maker is the type in which the brew strength is controlled in accordance with its ability to conduct an electric current. In this type of automatic coffee maker, the amount of ionization (pH and density appear to be reliable measures of coffee strength) is utilized to determine when the proper strength of brew has been made. This type of coffee maker is generally shown in Sauter Patent No. 1,923,889. However, this system has certain major drawbacks which prevent the coffee made in accordance with Sauter's teachings from being consistently of a given brew strength. These inaccuracies are apparently due to four main causes which are as follows: (1) A short time or transient voltage variation may trip the magnetic relay before the proper brew strength is obtained due to a temporary or transient increase in voltage supply to the coffee maker which will increase the current flow to that necessary to actuate the relay before the brew strength is attained. (2) The long-term variation of voltage across the electrodes will cause a variation in current conducted through the brew and consequently to the magnetic relay so that the current flowing through the relay is not proportional to brew strength alone but rather is proportional to the combination of the changing voltage and the changing brew strength so that the desired brew strength will not always be obtained. (3) Changes in applied voltage also changes the B. t. u. output of the electric heater, changing the percolation rate which alters the final temperature of the brew. Since the conductivity of the brew is not only responsive to concentration but is also responsive to temperature, a consistent brew may not be had without compensating for the temperature of the brew. (4) This type of coffee maker like the preceding thermostatic type is also responsive to the initial temperature of the water at the time of commencing the percolation.

A primary object of this invention is to provide an electrical system for determining a given characteristic of a material which is compensated for one or more variables which would tend to render its determination inaccurate.

A further object is to provide electrical means for determining a given characteristic of a fluid in accordance with its electrical conduction at any temperature and which means is suitably compensated to provide an indication of this characteristic under a given set of standard conditions.

A further object is to provide such a characteristic determining means which is relatively unaffected due to changes in voltage of the electrical circuit.

A further object of this invention is to provide an automatic coffee maker which will overcome the objections to the prior art coffee makers and automatically make a coffee brew of a given strength.

A further object is to provide such a coffee maker which is compensated for changes in temperature of the water which is initially used at the start of the coffee-making process.

A further object is to provide a coffee maker which is not affected by short transient voltage changes of the voltage applied thereto and at the same time is sensitive to changes in current flowing due to changes in brew strength.

A further object is to provide a coffee maker of the above general characteristics which is compensated for long-time changes in voltage applied thereto.

A further object is to provide such a coffee maker which compensates for changes in conductivity of a given brew strength with change in temperature of the brew.

A further object is to provide such a compensated coffee maker which is simple in operation and economical of manufacture and which has few parts to get out of adjustment or cause operating difficulties.

A further object is to provide such an automatic coffee maker in which the desired brew strength of the coffee to be brewed may be changed at the will of the operator.

Further objects will be apparent from the drawings and a reading of the specification and appended claims.

In the drawings which are to be taken as illustrating rather than limiting the invention and in which like parts in the various figures are designated with like reference numerals:

Fig. 1 is a view partly in plan and partly in section of a coffee maker embodying the invention;

Fig. 2 is a schematic diagram of the electrical circuit for the coffee maker;

Fig. 3 is a schematic diagram of a slightly modified electrical circuit for the coffee maker;

Fig. 4 is a plan view showing the bimetallic actuator;

Fig. 5 is a view taken substantially along the line 5—5 of Fig. 1 looking in the direction of the arrows;

Fig. 6 is a view taken substantially along the line 6—6 of Fig. 5 looking in the direction of the arrows;

Figs. 7 and 8 are partial views showing various types of heat motors which may be used with the coffee maker;

Fig. 9 is a schematic representation of the various compensating functions of the bimetallic actuator;

Figs. 10–15 show various modified forms of compensators; and

Fig. 16 shows a modification of the invention.

It will be appreciated from a complete understanding of the present invention that, in a generic sense, the improvements thereof may be embodied in widely differing apparatuses which may be utilized for a variety of purposes. A preferred use of the invention is in connection with the brewing of coffee, and by way of illustration but not of limitation the invention is so described herein.

Referring to the drawings by characters of reference, the numeral 1 designates generally a percolator-type coffee maker having a liquid reservoir 2 with a bottom wall 4. A heat pump 6 is carried by the bottom wall 4 and has a vertically extending central tube or conduit 8 whereby water may be pumped from the pump 6 up against the top 10 of the percolator 1 from whence it flows downwardly through the concentrate containing basket 12 back into the reservoir 2 in the usual manner of a coffee percolator.

The heat pump 6 comprises generally a pair of concentric cylindrical members 14 and 16 which form an annular chamber closed at its upper end 20 for receiving the main heating coil 18. The hollow chamber 22 within the inner cylindrical member 16 has its upper end closed by an apertured member 24 through which the tube 8 extends. A valve plate 26, loosely mounted on the tube 8 within the chamber 22, is held closely to but not tightly against the underside of the apertured member 24 by means of a shoulder on the tube 8. Liquid from the reservoir 2 flows through the apertured member 24 into the chamber 22 where it is heated by the main heating coil 18. As the fluid in the chamber 22 is heated, it moves the valve plate 26 upwardly to close the aperture through the plate 24, and the vapor generated will force a substantial part of the liquid from the chamber 22 up through the conduit 8 against the top wall 10 from whence it returns to the reservoir 2 through the concentrate in the basket 12.

A cup-shaped base portion 30 houses the electrical control apparatus for controlling the energization of the heater 18 and may be held to the lower wall 4 by any suitable means but preferably a means in which the cup-shaped housing 30 may be easily removed for replacement or checking of any of the apparatus contained therewithin.

The control system for the heater 18 comprises a pair of spaced electrodes 32 and 34 located within the reservoir 2 and a bimetallic control member 36 having a heater 38 arranged in series circuit and fed by a source of electrical energy which may be a transformer 40. The electrodes 32 and 34 are electrically insulated from each other except for the conductivity of the liquid within the reservoir 2, and therefore the current which will flow through the series circuit will be a function of the conductivity of this liquid or coffee brew. It has been experimentally ascertained that for a given coffee brew strength at a given temperature, the conductivity thereof will be of a predetermined magnitude; however, it has been further determined that the conductivity of the coffee brew will materially increase with an increase in brew temperature, even though the brew strength is maintained constant. It therefore becomes necessary not only to measure the conductivity of the coffee brew but also to correlate this measurement with the brew temperature at which it is being measured.

The U-shaped bimetallic member 36 having spaced substantially parallelly extending legs 42 and 44 is located in the housing 30 so that the ambient temperature about the member 36 is proportional to the temperature of the liquid in the reservoir 2 and as much as is practical free from the influence of the temperature of the medium surrounding the pot 1 or of the surface upon which the pot is resting, it being understood, however, that for practical purposes an absolute freedom of influence from the surrounding medium or surface is not essential within normal limits of its variations. As will be described more fully below, this member 36 provides the necessary correlation between brew temperature and electrode current and actuates the main heater switch 46 for de-energizing heater 18. More specifically, one terminal of the heater 18 is connected directly to one terminal of a cord-receiving plug 48 adapted to be connected to a household convenience outlet for supplying suitable alternating or direct current. The other terminal of the heater 18 is connected to one terminal of the normally open electric switch 46 having its other terminal directly connected to the other terminal of the plug 48 so that when the switch 46 is closed and the plug 48 connected to a source of electrical energy, the heater 18 will be energized for causing percolation in the coffee pot 1.

The primary winding of the transformer 40 is connected in shunt relation across the terminals of the main heater 18 so that the control circuit is energized whenever the heater 18 is energized and will be de-energized upon the completion of the brewing operation. One terminal of the secondary winding of the transformer 40 is connected to one terminal of the control heater 38. The other terminal of heater 38 is connected to the electrode 32 which, as shown in Fig. 1, is located within the reservoir 2 and surrounded by the liquid contained therein. The other electrode 34 which is spaced from the electrode 32 and also located within the reservoir 2 and surrounded by the liquid is connected through a brew strength-determining variable resistor 50 to the other terminal of the secondary winding of the transformer 40. The setting of the resistor 50 is controlled by a knob 51 which rotates a hollow shaft connected to the sweep arm of the resistor 50. The U-shaped bimetallic member 36 has its legs 42 and 44 connected by a cross member which has an upturned flange 58 which prevents bending of the bimetal in a plane tranverse to the normal movement of the legs 42 and 44 upon heating and cooling.

The free end of the leg 42 has a mounting tab 60 which may be secured to a suitable support for locating the bimetal member 36. Preferably the tab 60 and the support have aligned apertures spaced rearwardly from the plane of the free ends of the legs 42 and 44 through which a rivet or other fastening means extends to hold member 36 in a set but adjustable position. A latch 62 for latching the switch 46 in closed position is pivotally supported, as at 64. Normally when the bimetal leg 44 is at ambient temperature, the free end thereof is operable to seat against a lower shoulder 66 of the latch 62 to hold the latch in a position to hold the switch 46 closed. As the free end of the bimetal leg 44 moves upwardly (as seen in Fig. 2) due to increase in temperature thereof, it finally passes beyond a shoulder 68 spaced upwardly from the shoulder 66 whereby the latch 62 may rotate in counterclockwise direction under the action of the normally open switch 46 with the free end of the bimetal leg 44 moving into the slot in the latch 62 above the shoulder 68. The switch 46 will open its contacts and de-energize the main heater 18. In order that the operator may have a visual signal as to whether the heater 18 is energized or de-energized, a suitable pilot light 70 (Figs. 1 and 5) may have its terminals connected in shunt across the main heater 18 as seen in Fig. 2 or a low voltage pilot light 70a may be energized from the tapped secondary winding of transformer 40 as seen in Fig. 3.

The circuit shown in Fig. 3 is identical to that shown in Fig. 2 with the exception than an additional control heater element or coil 80 is carried about the leg 42 to provide a long-term voltage-change compensation. The terminals of this heater 80 are connected directly and continually across the output terminals of the secondary winding of the transformer 36. Theoretically this compensation is necessary to correct for changes in current flow between the electrodes 32 and 34 due to long-term changes in voltage therebetween caused by long-term changes in voltage of the energy-supplying lines to which the coffee maker is attached. The short term or transient changes are taken care of by the dash-pot action due to the time required for the heaters 18, 38 and 80 (if used) to reflect a temperature change of the member 36 in response to current changes. In practice, however, while somewhat greater accuracy may be had by the use of the element 80, it has been found that by a proper proportioning of the relative lengths of the legs 42 and 44 the element 80 may be omitted.

Before proceeding to a detailed discussion of the compensating characteristics of the above-described structure it is noted that generically the invention comprehends a controlling or indicating system for determining a desired characteristic of matter whether it be in a fluid or a solid state and which determination is compensated for changes in a variety of variables which may tend to give false or inaccurate determinations. Somewhat more specifically, the invention comprehends the determination of the desired characteristic by an electrical network having means for compensating for, among other variables, changes in the voltage of the network and for changes in temperature of the matter. Still more specifically the invention effects the determination of the desired characteristic of matter by measuring its electrical conductivity and compensating for the temperature at which the conductivity is being measured and the strength of the voltage being used.

In a generic sense, any of various forms of compensating elements may be used. In accordance with narrower aspects of the invention, certain preferred and illustrated embodiments utilize temperature-responsive, or thermal, means, and another utilizes a combination of magnetic and thermal means. Also, while the invention is shown as relating to a coffee maker, it will be readily apparent that, generically, it may be applied to the measuring of a characteristic of a liquid, which characteristic affects its conductivity; and if this conductivity varies with the temperature of the fluid, the measurement may be compensated for such temperature and furthermore may be compensated for the particular potential applied between the electrodes. Broadly stated, the compensating feature of the device provides means for recalibrating the indicator or control mechanism for the particular set of variables present at the time the determination is being made so that the determination is relatively independent of such variables and determines what the characteristic would be under a set of standard conditions. Furthermore, while the specific embodiment of the compensation is shown in connection with a conductivity measuring coffee maker, it may, generically, also be applied to the purely temperature-responsive type of coffee maker to compensate for changes in the voltage applied to the main heater thereof, as for example by the use of the voltage-responsive element 80 to recalibrate the temperature at which the thermostat de-energizes the main heater.

It will also be noted from the foregoing that in the more generic aspects of the invention as applied to brewing that various instrumentalities may be utilized to produce the brewing operation, in this case percolation, and bring the entire body of brew up to a desired temperature. In the illustrated embodiment of the invention electric heating means is used to perform the several functions, and it will be noted that the same heater which operates the pump also serves as the source of heat for bringing the entire body up to temperature.

Fig. 9 shows schematically or diagrammatically the various control functions accomplished by the bimetallic member 36 on a particular brewing application. The section 100 represents the leg 44 and has the heater 38. The sections 102, 104, 106, and 108 collectively represent the leg 42 having the element 80. Section 102 compensates for changes in the temperature surrounding the member 36 and acts to adjust the absolute temperature to which the section 100 must be raised to unlatch the latch 62 so that the section 100 actuates the latch 62 proportionally to the current flow through heater 38. Section 104 with the element 80 compensates for changes in current flow between the electrodes 32 and 34 due to voltage changes therebetween. It tends to move the section 100 downward with increase in current flow through the element 80 to exactly compensate for the added upward movement which would be imparted to the section 100 by the increased current flow through heater 38, at the desired brew strength, caused solely by the increase in voltage between the electrodes. Section 106 compensates for the change in the temperature of the water or other liquid which is present in the reservoir 2 and will of course act in a manner similar to that of changes in ambient temperature. It preferably is located such that its temperature approximates a directly proportional relation with the liquid temperature so that it will be relatively uninfluenced by the temperature of the room in which the pot 1 is located or of the surface upon which it is resting. Section 108 compensates for the heating effect imparted to the liquid within the reservoir due to the change in heating effect of the heater 18 with changes in voltage applied thereto. Since an increase in voltage applied to the heater 18 causes more rapid percolation due to the greater amount of heat available for percolation, the time required for the liquid to reach the desired brew strength is shortened as well as the time period in which heat is supplied directly to the reservoir 2, thereby providing an effect which would tend to lower the temperature of the brew when it has reached full strength. Section 108 therefore acts in a direction opposite to sections 102, 104, and 106 and tends to move the section 100 upwardly with increase in the voltage applied to the main heater 18.

In practice, simplification may be achieved by not individually isolating the various correction factors which must be applied to compensate for the various variables which affect the final brew.

From a study of Fig. 9 it will be apparent that sections 102 and 106 can be combined and the single element located in a position in which it is responsive to a temperature proportional to the combined temperature of the liquid in the reservoir and to ambient temperature. This single element will then perform the functions of the sections 102 and 106. Further, as explained hereinbefore, the effect of an increased voltage on the heater 18 is reflected in the temperature in the liquid in reservoir 2. This, it will be remembered, is because such a voltage change increases the rate of percolation so that the temperature of this liquid is raised at a lower rate relative to the increasing brew strength than with normal voltage applied to the heater 18. Therefore, since the effect of section 108 is in a direction opposite that of sections 102 and 106, the single element could be shortened, and in such a condition it would represent the effect of the combined sections 102, 106 and 108. It is apparent that if a heater of proper strength were applied to the combined element just described, it would effect a temperature change corresponding to section 104.

Therefore, a single bimetallic member 36 having the before-mentioned legs 42 and 44 will provide, within practical limits, the necessary correction. By properly proportioning the length of the leg 44 with respect to the length of the leg 42 and mounting the aforesaid heater 38 and element 80 thereon, reasonable correction may be obtained. In one particular instance it was found that the leg 44 must be slightly shorter than the leg 42. It may be, however, that with other combinations of heaters and bimetallic members and different physical positioning thereof with respect to each other and to the reservoir 2 that the legs 42 and 44 would require a different relationship. By a reference to the various components as are diagrammatically shown in Fig. 9, it will be apparent whether the leg 42 must be lengthened or shortened to give more or less correction for the variable which is discovered to be over or under compensated and to apply more or less heat by the element 80 so that a simple trial-and-error method can be used to get the exact desired compensation for a particular coffee maker. It has also been found that by slightly lengthening the leg 42 over the length required by the use of the element 80, satisfactory compensation may be had without the use of the element 80 within the normal ranges of voltage variation expected on the usual public utility power lines.

In order that the latch 62 may be manually moved to close the switch 46, a rotatable leg 84 carried by a control knob 86 extending through the control shaft for the rheostat 50 is provided so that upon counterclockwise rotation of the knob 86 the leg 84 engages the underside of the latch 62 and rotates the latch in a clockwise direction closing the switch 46; and if the leg 44 is of sufficiently low temperature the leg 44 will move downwardly toward the shoulder 66 away from the shoulder 68 and maintain the latch in this clockwise rotated position holding the switch 46 closed. A second arm 88 rotated by the same knob 86 may be provided so that upon counterclockwise rotation of the knob 86 a tapered or cammed end portion 80 thereof will engage and flex the free end of the leg 44 into the slot of the latch 62 above the shoulder 68 so that the switch 46 is permitted to move to open position. This manual de-energization of the heater 18 may be employed in cases where it is desired to turn off the coffee pot prior to the time that the coffee being brewed therein has reached the desired strength for which the control has been set. The manual energization of the switch 46 will be used each time to start the brewing operation.

Reference is now made to the operation thereof which is as follows. After the desired amount of water is placed in the reservoir 2, the desired amount of coffee or other concentrate is placed in the basket 12, the top 10 is placed in closed position and the plug 32 has been energized, the operater rotates the knob 86 clockwise to move the latch 62 in a clockwise direction to close the switch 46. Closure of the switch 46 establishes a circuit from the plug 48, through the heater 18, the switch 46, and back to the plug 48. The heater 18 now being energized will apply heat to heat the liquid in the chamber 22 of pump 6. The vaporization of some of the liquid in this chamber 22 will force other of the liquid upwardly therefrom through the conduit or tube 8 against the top 10 from whence it flows down through the coffee in the basket 12 back to the reservoir 2 so that the strength of the coffee in the reservoir 2 is increased. The primary of the transformer 40 being connected directly in shunt with the heater 18 will be energized upon energization of the heater 18 to energize the secondary control circuit thereof. The resistance to current flow through the liquid in the reservoir 2 between the electrodes 32 and 34 determines the amount of current flowing through the control heater coil 38. The initial current flowing through the control heater 38 is so related to the normal radiation from the heater 38 and other factors well known in the art that the temperature of the bimetal leg 44 is not raised sufficiently to cause the free end thereof to trip the latch 62. As the strength of the coffee in the reservoir 2 increases, the effective resistance thereof between the electrodes 32 and 34 will decrease, thereby increasing the current through the control heater 38. The variable resistance 50 is so adjusted that when the particular strength of the coffee of the reservoir 2 has been reached, the increase in current flow is sufficient so that the magnitude of current flowing through the heater 38 is that required to move the free end of the leg 44 just above the shoulder 68 allowing the switch 46 to open and de-energize the heater 18 and transformer 40. The free end of the leg 44 now resting on the shoulder 68 will not tend to move downwardly to again rotate the latch 62 in a clockwise direction, but will remain upon the shoulder 68 and the switch 46 will remain open until manually reset as above described.

Fig. 7 shows a modified form of heat pump 6a in which the pump, instead of being located in the reservoir 2 of the coffee maker 1, is located beneath the bottom wall 4 thereof. It will be obvious that bimetallic member 36 in this instance will be more directly affected by a change in voltage applied to the main heater 18a of the heat pump 6a than would occur with the heat pump 6. The use of the heat pump 6a therefore requires a slightly different length of the bimetallic leg 42, since its temperature would be more directly affected by the heat from the main heater 18a.

Fig. 8 shows still another modified form of heat pump 6b in which the pump is located within the reservoir 2 of the coffee maker 1. The heat pump 6b will affect the bimetallic member 36 in much the same manner as it is affected by the heat pump 6. However, the particular construction of the pump 6b is slightly different. Liquid from the reservoir 2 will flow into an annular chamber 22b through orifices 23. The orifices 23 are of such size that when the liquid within the reservoir or chamber 22b is heated, more liquid will be forced up through the tube or conduit 8b than is forced backward into the reservoir 2 through the orifices 23.

Figs. 10 to 15 inclusive show modified forms of compensating thermostatic elements 36c to 36h inclusive. In Fig. 10 the member 36c is provided with a transversely extending flange 58c arranged to extend diagonally with respect to the legs 42c and 44c so that the proper differential action is attained therebetween. The usual heater coil 38 is applied to the leg 44c and, if desired, the heater element 80 may be applied to the leg 42c. Fig. 11 shows a modification in which the legs 42d and 44d are of different lengths and are arranged in series and in which the heater 38 is carried about the leg 44d. The end of the leg 42d opposite that secured to the leg 44d is carried by a suitable supporting member corresponding to the lug 60 of the member 36. The free end of the leg 44d will of course be operable to actuate a latch member for the switch of the main heater 18. In Fig. 12 one end of the bimetallic leg 44e is held rigidly with a suitable support, and the free end is operable to engage shoulders 66e and 68e of a latch 62e pivotally carried by the free end of the bimetallic leg 42e. In this modification it will be obvious that the latch 62e is moved by the leg 42e in accordance with temperatures affecting this leg 42e, while the leg 44e is moved by the temperature imparted thereto by the heater 38. The compensation is afforded by varying the lengths of the different legs. In Fig. 13 one end of the leg 42f is carried by a suitable support 62f corresponding to the lug 60. Corresponding ends of the legs 42f and 44f are rigidly joined together by a suitable support unaffected by temperature so that the free end of the leg 44f is operable to actuate a latch for controlling the main heater switch similarly, as shown in Fig. 2. Fig. 14 shows a modified bimetallic control member 36g having two helical bimetallic members oppositely wound so that the latch-engaging portion 37g thereof will control operation of the switch of the main heater. It will be obvious that if the lengths of the two helixes are unequal, similar to legs 42 and 44, and a heater 38g is provided, the portion 37g will actuate the switch-controlling latch similar to Fig. 2. In Fig. 15 the bimetallic member 36h has the outwardly extending legs 42h and 44h. The leg 44h carries the heater 38h. The free end of the leg 42h is held rigid relative to the latch by means of a bracket or lug 60h. Therefore, as the temperature of the leg 42h varies, the effective temperature in which the leg 44h will operate the latch will be adjusted similarly to the adjustment of the leg 44 by leg 42 as shown in Fig. 2. Referring to the modification of Fig. 16, the electrodes 32 and 34 are located within the reservoir 2 as shown in Fig. 1. A temperature compensating element 200, which may be a resistor, is positioned so that its temperature is proportional, similarly to that of the member 36, to the temperature of the liquid in the reservoir 2. The element 200 is fabricated of a suitable material so that as the temperature of the liquid in the reservoir 2 varies, the voltage drop thereacross compensates as closely as practicable the change in conductivity of the liquid brew due to changes in temperature thereof so that the current flow between the electrodes 32 and 34 actuates the magnetic relay 204 in accordance with brew strength and, within practical limits, irrespective of the brew temperature or temperature of the relay 204. In this arrangement the relay 204 is positioned so that its temperature is a function of the brew temperature; therefore the changes in permeability of its core due to changes in temperature thereof may be, within practical limits, compensated for by the element 200 responsive to brew temperature. In order to compensate the relay 204 for long-time changes in voltage across the plug 48, which of course will be reflected as a change in potential between the electrodes 32 and 34, a coil 206 has been provided on the core of the relay 204. The coil 206 is connected directly across the secondary winding of the transformer 40. To compensate for transient or short-time fluctuations in voltage across the plug 48, a dash pot 208 operatively connected to the armature 210 of the relay 204 has been provided to dampen operation of the armature 210.

It will be recognized that the control circuit of Fig. 16 is similar to that of Fig. 3 and the operation thereof will be similar except that the controlling function of the leg 44 of the member 36 is handled by the element 200 and except for the effect of the heater 80 which is taken care of by the coil 206. The dash pot 208 dampens the operation of the armature 210 so that the contacts 212 of relay 204 will not be prematurely opened due to voltage transients. It is believed that a further description of the operation of this control system is unnecessary in view of the detailed disclosure set forth above.

What is claimed and is desired to be secured by United States Letters Patent is as follows:

1. In a control for a beverage brewing device having means actuatable upon energization to increase the brew strength of the beverage, regulating means operable to de-energize such strength increasing means to including a bimetallic unit having a first portion responsive to the temperature of the beverage and having a second temperature responsive portion, said regulating means being operable in accordance with the conjoint action of said portions, an electric heating element for heating said second portion, a pair of electrodes adapted to be positioned in the beverage, an electric control circuit including said element and said electrodes whereby current flowing between said electrodes will enable said element to heat said unit second portion, said first portion being effective to adjust the temperature to which said second portion must be raised to cause said regulating means to de-energize said strength means whereby said strength means will be de-energized at the desired brew strength of the beverage.

2. In a control for a beverage brewing device having means actuatable to increase the brew strength of the beverage including a main electric heater, a circuit adapted to control the energization of said heater, a normally open electric switch controlling said circuit for controlling the energization of said heater, a trip means for holding said switch in closed circuit position, a U-shaped bimetallic element having substantially parallelly extending legs of unequal length, a support held in fixed position relative to said switch, means securing the free end of one of said legs to said support, means operatively connecting the free end of the other of said legs to said trip means and operable upon change in temperature to actuate said trip means to permit said switch to move to its normally open condition, said element being located relative to the beverage such that the temperature of said longer leg is proportional to the temperature of the beverage, a control electric heater in heat exchange relation with said shorter leg, a pair of electrodes adapted to be completely immersed in the beverage whereby current flow between said electrodes is a function of the conductivity of such beverage, and means connecting said electrodes in series circuit with said control heater whereby the conductivity of the beverage effects a change in temperature of said control heater.

3. In a control for a beverage brewing device having means actuatable to increase the brew strength of the beverage including a main electric heater, a circuit for said heater, a normally open electric switch controlling said circuit for controlling the energization of said heater, trip means for holding said switch in closed circuit position, a U-shaped bimetallic element having substantially parallelly extending legs of unequal length, a support held in fixed position relative to said switch, means securing the free end of the longer of said legs to said support, means operatively connecting the free end of the shorter of said legs to said trip means and operable upon change in temperature to actuate said trip means to permit said switch to move to its normally open condition, said element being located relative to the beverage such that the temperature of said longer leg is proportional to the temperature of the beverage, a control electric heater in heat exchange relation with said shorter leg, a pair of electrodes adapted to be completely immersed in the beverage whereby current flow between said electrodes is a function of the conductivity of such beverage, circuit means deriving its potential from that appearing across said main heater and including in series circuit said electrodes and said control heater whereby the conductivity of the beverage effect a change in the heating effect of said control heater.

4. In a device of the character described for use with a body of fluid, a bimetallic actuator having a pair of bimetallic portions warpable in response to temperature changes, a device actuated by said actuator as a consequence of the conjoint warping of said bimetallic portions, a pair of electrodes constructed to be immersed at least in part in such fluid, an electrical circuit including said electrodes and associated with one of said bimetallic portions to heat said one bimetallic portion to cause warpage thereof as a function of the magnitude of current flowing between said electrodes, the other of said bimetallic portions being positioned relative to such fluid to assume a temperature which is a function of the temperature of such fluid and acting conjointly with the warpage of said one bimetallic portion to control said actuated device.

5. In a device of the character described for use with a body of fluid, a U-shaped bimetallic actuator having a pair of bimetallic legs warpable in response to change in their temperature, a device actuated by the free end portion of a first of said legs, means for anchoring the free end portion of a second of said legs, a pair of electrodes constructed to be immersed at least in part in such fluid, an electrical circuit including said electrodes and associated with one of said bimetallic legs to heat said one leg to cause warpage thereof as a function of the magnitude of current flowing between said electrodes, the other of said bimetallic legs being positioned relative to such fluid whereby it will assume a temperature which is a function of the temperature of such fluid, said other leg acting to control the degree of warpage of said one leg necessary to actuate said actuated device.

6. In a device of the character described for use with a body of fluid, a U-shaped bimetallic actuator having a first and a second bimetallic leg warpable in response to changes in their temperature, a device actuated by the free end portion of one of said legs as a consequence of the relative warping of said legs, a pair of electrodes constructed to be immersed at least in part in such fluid, an electrical circuit including said electrodes and associated with said first bimetallic leg to heat said first bimetallic leg to cause warpage thereof as a function of the magnitude of current flowing between said electrodes, means anchoring the free end of the other of said bimetallic legs to position said second leg whereby said second leg will assume a temperature which is a function of the temperature of such fluid, and a second heater associated with said second leg and energized from a source of voltage the magnitude of which is a function of the magnitude of voltage supplied to said first named circuit.

7. In a control for a beverage brewing device having means actuatable to increase the brew strength of the beverage, regulating means operable to disable such strength increasing means, including a thermostatic portion responsive to the temperature of the beverage, a second thermostatic portion, said regulating means being operable in accordance with the conjoint action of said thermostatic portions, an electric heating element for heating said first mentioned thermostatic portion, a pair of electrodes adapted to be positioned in the beverage, an electric control circuit including said element and said electrodes whereby current flowing between said electrodes will enable said element to heat said first mentioned thermostatic portion, said second thermostatic portion being effective to compensate for changes in the conductivity between said electrodes due to changes in temperature of the beverage whereby said strength means will be de-energized at the desired brew strength of the beverage independently of the temperature of the beverage.

RUPERT B. BELL.

References Cited in the file of this patent

UNITED STATES PATENTS

| Number | Name | Date |
|---|---|---|
| 1,379,266 | Keeler | May 24, 1921 |
| 1,587,106 | Edelman | June 1, 1926 |
| 1,612,363 | Dorfman | Dec. 28, 1926 |
| 1,923,889 | Sauter | Aug. 22, 1933 |
| 1,974,923 | Lucia | Sept. 25, 1934 |
| 1,998,726 | Larsen | Apr. 23, 1935 |
| 2,076,096 | Samuels et al. | Apr. 6, 1937 |
| 2,150,015 | Witham | Mar. 7, 1939 |
| 2,179,811 | Brosseau | Nov. 14, 1939 |
| 2,268,655 | Gomersall | Jan. 6, 1942 |
| 2,281,319 | Newell | Apr. 28, 1942 |
| 2,302,315 | Hall | Nov. 17, 1942 |
| 2,367,746 | Williams | Jan 23, 1945 |
| 2,370,609 | Wilson et al. | Feb. 27, 1945 |
| 2,414,396 | Sardeson | Jan. 14, 1947 |
| 2,446,029 | Tramontini | July 27, 1948 |
| 2,450,459 | Thomson | Oct. 5, 1948 |
| 2,470,153 | Feller | May 17, 1949 |
| 2,500,042 | Nutting et al. | Mar. 7, 1950 |